US012688522B1

(12) United States Patent
Gray et al.

(10) Patent No.: US 12,688,522 B1
(45) Date of Patent: *Jul. 21, 2026

(54) SYSTEMS AND METHODS FOR CALLING PARTY AUTHENTICATION

(71) Applicant: United Services Automobile Association (USAA), San Antonio, TX (US)

(72) Inventors: Emily Margaret Gray, San Antonio, TX (US); Ross Andrew Thiele, San Antonio, TX (US); David Alexander Lilley, Schertz, TX (US); Justin Dax Haslam, San Antonio, TX (US); Brad D. Wells, Boerne, TX (US); Vijay Jayapalan, San Antonio, TX (US); Debra Randall Casillas, Helotes, TX (US); Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/962,930

(22) Filed: Nov. 27, 2024

Related U.S. Application Data

(63) Continuation of application No. 18/420,755, filed on Jan. 23, 2024, now Pat. No. 12,175,510, which is a
(Continued)

(51) Int. Cl.
*G06Q 30/00* (2023.01)
*G06Q 30/018* (2023.01)
(Continued)

(52) U.S. Cl.
CPC ....... *G06Q 30/0609* (2013.01); *G06Q 30/018* (2013.01); *H04L 63/083* (2013.01)

(58) Field of Classification Search
CPC .................................................. G06Q 30/0609
See application file for complete search history.

(56) References Cited

U.S. PATENT DOCUMENTS

| | | |
|---|---|---|
| 11,100,548 B1 | 8/2021 | Gray et al. |
| 11,770,474 B1 | 9/2023 | Cairns et al. |
| | (Continued) | |

OTHER PUBLICATIONS

Fujii, Haruhiko, et al. "Telelogin: a two-factor two-path authentication Technique Using Caller ID." NTT Techincal Review 6.8 (2008).*

(Continued)

*Primary Examiner* — Kathleen Palavecino
(74) *Attorney, Agent, or Firm* — Perkins Coie LLP

(57) ABSTRACT

Methods and systems described in this disclosure are directed to authentication of calling parties. The authentication of calling parties applies to simultaneous voice and/or data communications with multiple parties over multiple electronic mediums including a variety of electronic devices. A user can continue to maintain a data exchange session with a representative of an entity offering the goods or services of interest to the user across more than one user device. In some embodiments, a user can invite other parties in a multi-party call involving the user and the representative. Various embodiments for multi-party and multi-device authentication mechanisms are described herein. In some embodiments, the system calculates an estimated call waiting time for a user to speak with the representative.

20 Claims, 7 Drawing Sheets

Related U.S. Application Data continuation of application No. 17/382,231, filed on Jul. 21, 2021, now Pat. No. 11,915,285, which is a continuation of application No. 15/477,933, filed on Apr. 3, 2017, now Pat. No. 11,100,548.

(60) Provisional application No. 62/319,365, filed on Apr. 7, 2016.

(51) Int. Cl.
    *G06Q 30/0601*        (2023.01)
    *H04L 9/40*            (2022.01)

(56)                    References Cited

U.S. PATENT DOCUMENTS

| 11,915,285 | B1 | 2/2024 | Gray et al. | |
| 2002/0055975 | A1* | 5/2002 | Petrovykh | H04M 3/5191 |
| | | | | 709/204 |
| 2002/0073210 | A1 | 6/2002 | Low et al. | |
| 2012/0265694 | A1 | 10/2012 | Tuchman et al. | |
| 2013/0212289 | A1 | 8/2013 | Krishnakumar et al. | |
| 2013/0318249 | A1 | 11/2013 | McDonough et al. | |
| 2014/0119532 | A1 | 5/2014 | Marghescu et al. | |
| 2014/0173125 | A1 | 6/2014 | Selvanandan et al. | |
| 2015/0237207 | A1* | 8/2015 | Ordille | H04L 63/08 |
| | | | | 379/211.02 |
| 2015/0310377 | A1 | 10/2015 | Schlumberger et al. | |
| 2016/0125490 | A1 | 5/2016 | Angal et al. | |

OTHER PUBLICATIONS

Fuji, Haruhiko et al., "Telelogin: a two-factor path authentication Technique Using Caller ID." NTT Technical Review 6.8, 2008.

U.S. Appl. No. 18/420,755, filed Jan. 23, 2024, Systems and Methods for Calling Party Authentication.

U.S. Appl. No. 17/382,231 U.S. Pat. No. 11,915,285, filed Jul. 21, 2021 Feb. 27, 2024, Systems and Methods for Calling Party Authentication.

U.S. Appl. No. 15/477,933 U.S. Pat. No. 11,100,548, filed Apr. 3, 2017 Aug. 24, 2021, Systems and Methods for Calling Party Authentication.

U.S. Appl. No. 62/319,365, filed Apr. 7, 2016, Systems and Methods for Calling Party Authentication.

* cited by examiner

200

| MEMORY 205 | PROCESSOR(S) 210 | OPERATING SYSTEM 215 |
| APPLICATION 220 | PROFILE MODULE 225 | AUTHENTICATION MODULE 230 |
| COMMUNICATION MODULE 235 | GUI GENERATION MODULE 240 | |

300

| | | |
|---|---|---|
| MEMORY 305 | PROCESSOR(S) 310 | PROFILE MODULE 315 |
| TRIGGER DETECTION MODULE 320 | WAITING TIME ESTIMATION MODULE 325 | AUTHENTICATION MODULE 330 |
| COMMUNICATION MODULE 335 | GUI GENERATION MODULE 340 | |

SYSTEMS AND METHODS FOR CALLING PARTY AUTHENTICATION

CROSS-REFERENCE TO RELATED APPLICATIONS

This application is a continuation of U.S. patent application Ser. No. 18/420,755 filed Jan. 23, 2024, now allowed, which is a continuation of U.S. patent application Ser. No. 17/382,231 filed Jul. 21, 2021, issued as U.S. Pat. No. 11,915,285 on Feb. 27, 2024, which is a continuation of U.S. patent application Ser. No. 15/477,933 filed Apr. 3, 2017, issued as U.S. Pat. No. 11,100,548 on Aug. 24, 2021, which is a non-provisional of and claims priority to U.S. Provisional Application No. 62/319,365 filed Apr. 7, 2016, entitled "SYSTEMS AND METHODS FOR CALLING PARTY AUTHENTICATION," all of which are hereby incorporated by reference in their entireties for all purposes.

TECHNICAL FIELD

Various embodiments of the present disclosure relate generally to authentication. More specifically, various embodiments of the present disclosure relate to methods and systems for authentication of calling parties during multi-party calls.

BACKGROUND

When users receive calls from phone numbers they don't recognize, some users choose not to answer. The calling party may be forced to leave a message asking the user to return the call. Or, if the call was intended to be a multi-party call, both calling parties may have to coordinate schedules to re-call the user at a later time.

BRIEF DESCRIPTION OF THE DRAWINGS

Embodiments of the present disclosure will be described and explained through the use of the accompanying drawings in which.

DETAILED DESCRIPTION

Figure 1:
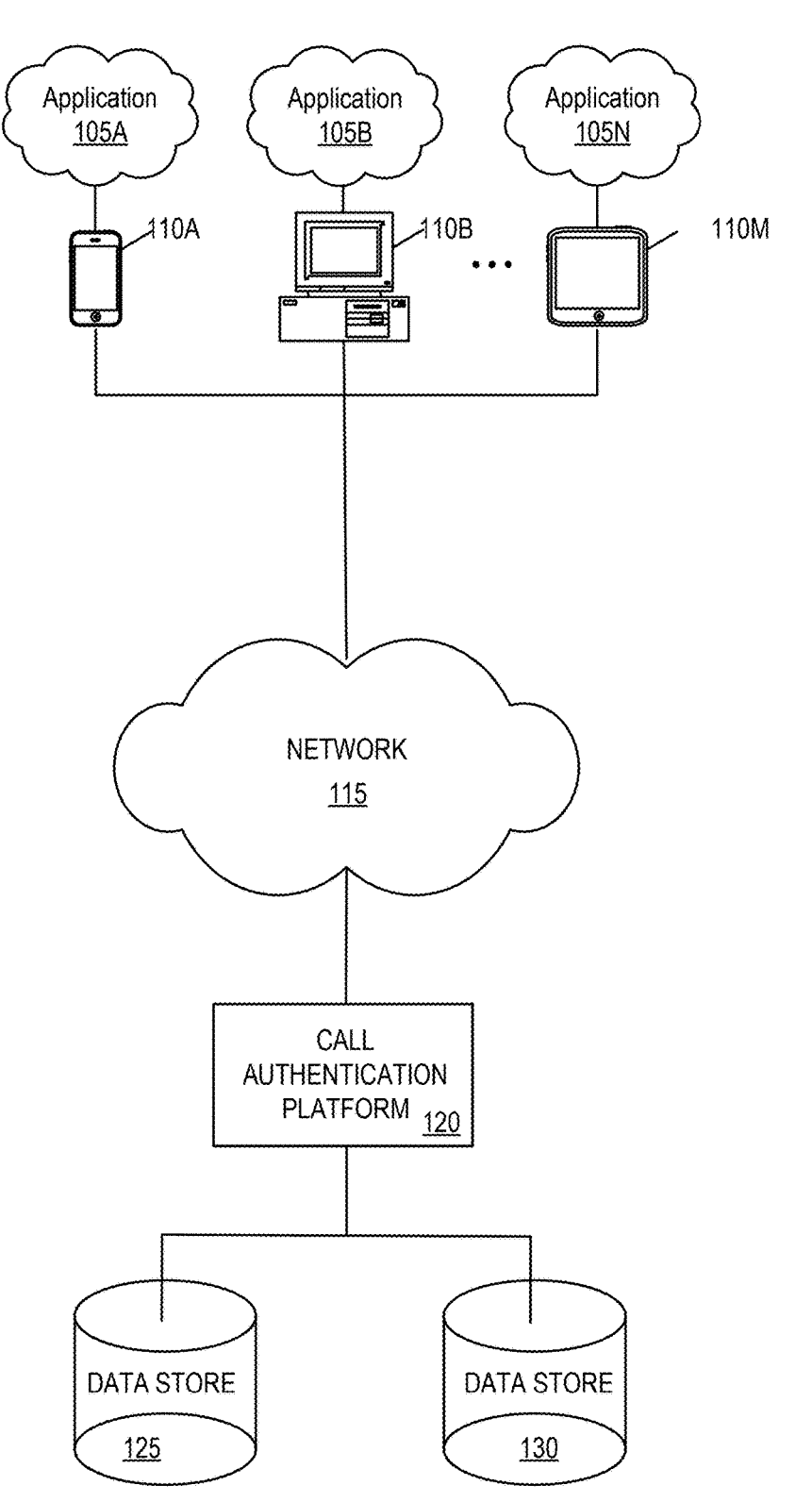
FIG. 1 illustrates an example of a network-based operating environment in accordance with various embodiments of the present disclosure.

Various embodiments of the present disclosure relate generally to authentication. More specifically, various embodiments of the present disclosure relate to methods and systems for authentication of calling parties. In some embodiments, the calling party can be authenticated during simultaneous voice and data communications with multiple parties over multiple electronic media, including a variety of electronic devices.

While customers are on a call with a representative of an organization, the customer may be required to exchange documents or acknowledgments with the representative before proceeding. Examples of documents include government-required disclosures (e.g., HIPAA disclosures), forms (e.g., mortgage applications), or authorizations. Traditionally, the user would either listen to the disclosure from the representative, when possible, or end the call and review and submit the document or acknowledgement outside of the call. In some scenarios, the user may have to sign the documents and then call back to the organization only to reach a different representative. Embodiments disclosed herein allow for documents such as disclosures to be made and acknowledged during the call.

Methods and systems disclosed herein facilitate a user (e.g., customer, member) speaking with a customer representative (e.g., representative at a call center of an organization or entity offering goods or services) to exchange data (e.g., electronic documents) with the customer representative during a voice and data call. For example, a user can electronically receive compliance information (e.g., forms, disclosures, regulatory information) for review, acknowledgement, and/or signature. The electronic exchange of data can take place prior to or during a call with the customer representative. For example, the user can exhibit an intent to call about transferring money (e.g., pressing a "see call wait time" button on a "transfer funds" page of a mobile application, calling an organization from a certain tab in an application). While the customer is waiting for the call or during the call while the customer is speaking with the representative, a disclosure can be sent to the user's device for the user to review and/or acknowledge.

In some embodiments, the data exchange can include a single device. For example, a user on a mobile phone speaking with a customer representative can exchange data with the customer representative via a mobile application running on the user's mobile phone.

In some embodiments, the data exchange session (e.g., reviewing documents on a website, speaking with a representative) can continue seamlessly across more than one device without requiring the user to enter login information. Thus, embodiments disclosed herein facilitate electronic sessions to continue seamlessly over multiple devices. Such capabilities may be helpful when the customer is reviewing a document (e.g., a disclosure). For example, a user on a laptop can add the data exchange session to a tablet computer, which may provide greater ease for the user in reviewing and/or signing electronic documents, before calling the customer representative. As an alternative example, a user on the phone with a customer representative can continue the data exchange session over a laptop computer while continuing to speak with the customer representative.

To continue the data exchange session, a remote server of the organization can communicate a session-specific code (e.g., a QR code or a pseudorandom number) to the device currently engaged with the organization (e.g., a mobile device of a user speaking to the representative). After receiving the session-specific code at the device, the user can enter the session-specific code into a second device to continue data exchange with the remote server. In some embodiments, the connection or the session of the first computing device with the server is not broken, but rather continues over to the second computing device. In other embodiments, the entire session is transferred.

In some embodiments, an organization can place a call to a user directly rather than the user placing a call into the organization. However, the customer may not know who is calling and may be unable to verify the identity of the caller. Embodiments of the present disclosure also provide methods and systems for authenticating a calling party. Prior to or during the call from the representative to the user, a push notification or other alert may be sent to the user's device stating that the user will be or is currently receiving a call from the organization. The message may provide further information such as a subject matter of the call. In some embodiments, the remote server can generate a token which can be compared to a token generated on the user's device.

When a user is on the phone with a representative, there are circumstances under which a third party should be added/present (e.g., a spouse of the user and the user have to jointly decide on changes to investments). However, the third party may not answer the phone if the called party cannot verify who is calling. Embodiments of the present disclosure also provide methods and systems for authenticating a calling party. The calling party may be authenticated using the mobile application, and a push notification or other notification may be used to notify the user that a call from the organization is forthcoming.

In such scenarios, the third party can be added into the ongoing call between the user and the customer representative. Furthermore, in such scenarios, the disclosed system provides a mechanism by which a mobile application program running on the third party's computing device can authenticate the identity of the organization or representative who will be calling the third party for the multi-party call. Thus, according to embodiments disclosed herein, the third party receives a call facilitated by the remote server after the authenticity of the remote server has been verified.

The remote server can verify the caller using the following process. The remote server, the phone, or a third party can generate a key (e.g., a cryptographic key) during an ongoing call between the user and a representative of an entity, and the remote server can communicate the key to the third party's computing device. The mobile application running on the third party's mobile phone can compare the key with one or more keys in a collection of keys (e.g., stored locally on the other party's computing device) to verify the authenticity of the server. A push notification, text message, or other indication may be sent to the third party's device to alert the third party that the call from the entity is forthcoming and the origination of the call has been verified.

In some embodiments, the third party's computing device generates a local version of the server-communicated key (e.g., using the server-communicated key or otherwise) and compares these two keys for authenticity of the server. In some embodiments, the server-communicated key can include additional information such as an IP address of the server, a hostname, an identification of the user who intends to initiate the multi-party call, and various other information that enables the other party's computing device to verify the authenticity of the server.

In some embodiments, authenticating the server is performed by a separate entity that confirms the keys are the same. In other embodiments, a second application on the third party's computing device is a verification software that uses the server-communicated key for verifying the authenticity of the server. The second application can communicate with the mobile application on the phone or directly with the remote server.

In advance of the multi-party call between the representative, the customer, and the third party, the remote server provides a notification of a forthcoming call that identifies the representative and/or the entity. Because the identity of the organization is authenticated, the third party is not exposed to taking calls from unrecognized phone numbers and is legitimately made aware that a representative of the organization is going to call.

Users may be contemplating calling an entity but do not know how long they will have to wait for a representative answer their call. Embodiments of the present disclosure allow for an estimate of time for a specialized representative to answer the call when the user is navigating through an application and evidences an intent to call. The intent may be shown using one or more embedded triggers that detect user interaction. Examples of embedded triggers can include a help menu, a contact menu, or a call initiation button included inside the application program. In some embodiments, the embedded triggers can be used to determine the goods or services that the user is interested in based on the user interaction with the application program running on the computing device. For example, if the user is browsing certain sections of certain electronic pages via a mobile application and the user selects a "contact us" button, the user can receive a notification (e.g., via a push notification) informing him or her of compliance information that he or she has to review or acknowledge prior to the call. In some embodiments, the notification includes an estimated call waiting time before he or she can speak with a customer representative.

In some embodiments, the remote server calculates an estimated call waiting time for the user to speak with a representative of an entity offering the goods or services of interest to the user. The estimated call waiting time, for example, can be based on a number of callers ahead of the user in a caller queue, an average duration of a call for exchanging information relating to the goods or services, and a total number of representatives having skills to assist the user with questions related to the goods or services. As used herein, a call waiting time, or simply waiting time, is the time that a user has to wait before speaking with a representative. In some embodiments, a user who intends to speak with a representative can choose to have the representative call the user back. In some embodiments, the user can be on hold in line waiting to speak with the representative after an estimated waiting time. In some embodiments, a user can call the representative after an estimated waiting time.

In some embodiments, in response to a user expressing an intent to call a representative of the entity, a remote server transmits compliance information to the user, in connection with goods or services of interest to the user, via an application program (e.g., desktop application or mobile application) running on the user's computing device (e.g., a desktop computer or a mobile device). In some embodiments, the compliance information is displayed on the computing device of the user for receiving an electronic signature or acknowledgement from the user on an electronic document displaying the compliance information. After the user's review or acknowledgement or signature, the electronic document is transmitted back to the remote server either via the same device or via another device. Thus, for instance, during a call with the representative, the representative can greet the user by saying, "We noticed you were browsing the Health Insurance page and we received your informed consent form. How can we help you?"

For purposes of explanation and illustration, the terms "application" and "application program" are generally synonymous. Further, these terms are applicable to applications running on any kind of device (e.g., a desktop application running on a desktop computer or on a laptop computer). Similarly, a "mobile application" applies to software running on mobile devices. Accordingly, such distinctions will be understood to be clear from the context of usage of the terms "application" or "application program." Additionally, for discussion purposes herein, the terms "entity" and "organization" are considered synonymous. In the discussions presented herein, the term "computer-generated key" or "key" is not limited and will apply to any kind of suitable key generation algorithms, tokenization algorithms, or cryptographic algorithms. Thus, the term "key" can, in some instances, be similar to "tokens." In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of medium/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to call authentication platform 120 and data stores 125 and 130.

Computing devices 110A-110M may be configured to communicate via the network 115 with call authentication platform 120. In some embodiments, computing devices 110A-110M can retrieve or submit information to call authentication platform 120 and run one or more applications with customized content retrieved by call authentication platform 120 and data stores 125 and 130. For example, computing devices 110A-110M can execute a browser application or a customized client to enable interaction between the computing devices 110A-110M, call authentication platform 120, and data stores 125 and 130. In some embodiments, call authentication platform 120 can be a server located remotely from the electronic devices.

Call authentication platform 120 can be running on one or more servers and can be used to facilitate authentication of calling parties for simultaneous voice and data communications with multiple parties over multiple electronic media including a variety of electronic devices, and/or perform other activities. In some embodiments, call authentication platform 120 calculates an estimated call waiting time for a user to speak with a specialized representative. The estimated call waiting time can be based on a number of callers ahead of the user in a caller queue, an average duration of a call for exchanging information relating to the goods or services, and a total number of representatives having skills to assist the user with questions related to the goods or services.

Network 115 can be any combination of local area and/or wide area networks, using wired and/or wireless communication systems. Network 115 can be, or could use, any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to user data such as user profiles; information relating to goods and services that are of interest to a user; user's financial and personal data; disclosures and compliance information reviewed, acknowledged, or signed by users; data received from third parties; one or more computer-generated keys or computer-generated codes communicated to users for authentication of calling parties involved in simultaneous voice and data communications with multiple parties over multiple electronic media including a variety of electronic devices; and other information. Data stores 125 and 130 may be a data repository of a set of integrated objects that are modeled using classes defined in database schemas. Data stores 125 and 130 may further include flat files that can store data. Call authentication platform 120 and/or other servers may collect and/or access data from the data stores 125 and 130. Information provided by users can be stored in data stores 125 and 130.

Figure 2:
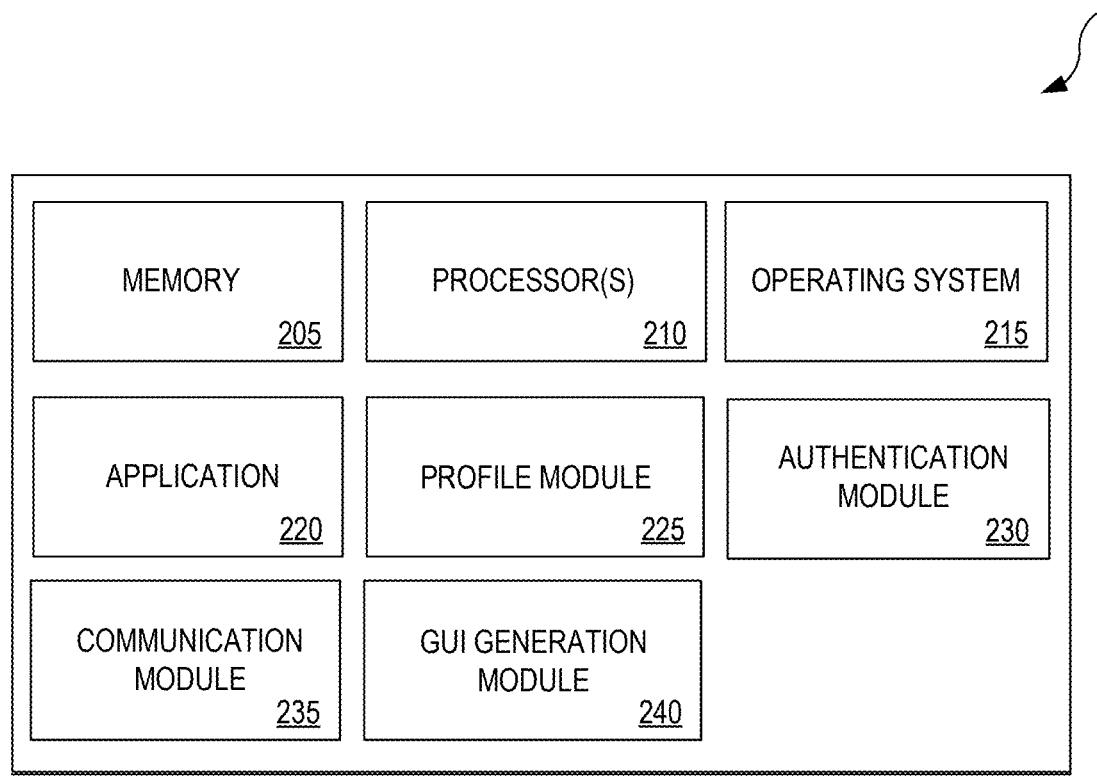
FIG. 2 illustrates various components of a computing device that may be used in accordance with various embodiments of the present disclosure.

FIG. 2 illustrates a set of components 200 within computing device 110 according to one or more embodiments of the present disclosure. The computing devices 110A-110M of user(s) can be used in voice and data calls with representatives of the entity offering the goods or services. The users may have initiated a session with representatives or may be contacted to join a multi-party call. According to the embodiments shown in FIG. 2, call authentication platform 120 can include memory 205, one or more processors 210, operating system 215, application 220, profile module 225, authentication module 230, communication module 235, and GUI generation module 240. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of operating system 215, application 220, profile module 225, authentication module 230, communication module 235, and GUI generation module 240. Generally, memory 205 can include any device, mechanism, or populated data structure used for storing information. In accordance with some embodiments of the present disclosure, memory 205 can encompass, but is not limited to, any type of volatile memory, nonvolatile memory (RAM), and dynamic memory. For example, memory 205 can be random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMS, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with call authentication platform 120. For example, application 220 can include an application for financial services, a money transfer application, a social networking application, and a gaming application.

Application 220 can access a server and/or a platform associated with an organization (e.g., call authentication platform 120) to display account data, display authentication requests and confirmations, and collect authentication information. For example, application 220 may be used to receive and take pictures of codes.

Profile module 225 can maintain personal and financial profiles for a user. Personal data of a user can include a name, an address, a phone number, an email, a unique identification number identifying a user, a photograph of the user, and login credentials such as a username and password for launching an application. Profiles may include users' personal data; bank/financial institution data; credit card/ debit card data, including electronic wallet identification information; details of one or more goods or services that the user is utilizing; insurance policies that the user has purchased; a collection of cryptographic keys for verifying the authenticity of a remote server associated with the entity offering the goods or services and/or information identifying a third-party verification software that both communicates with profile module 225 and also uses the server-communicated key for verifying the authenticity of the server associated with the entity offering the goods or services. The profile module 225 can query a networked database to retrieve profile information of users. Such profile information can be stored in the "cloud," or it can be physically coupled to profile module 225.

Authentication module 230 can provide one or more mechanisms for authentication of a user's computing devices. According to some embodiments, the disclosed system facilitates a user to continue an ongoing electronic session over a second device. For example, a voice call and/or a data exchange (e.g., involving exchange of compliance information forms, legal documents, regulatory information, disclosure statements, terms and conditions of goods or services, disclaimer information) can be continued on a laptop without requiring typical login credentials. The electronic communication can engage both devices simultaneously, or, in some embodiments, only one user device can be active at a time.

In some embodiments, the data exchange session can continue seamlessly across more than one device, without requiring the user to enter login information for identifying himself or herself to the server of the organization or entity. In some embodiments, authentication module 230 can be involved in authenticating a remote server of an organization offering the goods or services. For example, a first user on an ongoing call with a customer representative can request that a third party be invited to join the call. Prior to the representative calling the third party, authentication module 230 can authenticate a remote server of the organization for the third party so that the third party is alerted that he or she will receive a call and that call is from the organization. Such a verification can be performed at the third party's mobile application running on the third party's mobile device using a computer-generated key provided by the server. This key can, for example, include additional information such as an IP address of the server, a hostname, and/or an identification of the first user who intends to initiate the multi-party call.

In some embodiments, authenticating the server is performed by another entity. In other embodiments, the third party's computing device is authenticated by a second party mobile application program which communicates with the mobile application associated with the entity, where both mobile applications are running on the third party's computing device. In some embodiments, the other application is a verification software that uses the server-communicated key for verifying the authenticity of the server.

Communication module 235 facilitates communication (e.g., in the form of voice and/or data) with electronic devices, one or more remote servers of an organization offering goods or services, and mobile application programs via wireless communication methods such as cellular communication, near field communication (NFC), Bluetooth, and Wi-Fi. In some embodiments, communication module 235 can receive and/or transmit session-specific codes from/to a remote server when a user intends to continue a data exchange with a customer representative of an organization seamlessly across more than one device, without requiring the user to enter login information for identifying himself or herself to the server of the organization or entity. In some embodiments, communication module 235 can simultaneously maintain voice/data communications over different channels. In some embodiments, communication module 235 facilitates a multi-party conference by receiving a call from the representative from within an application program. In some embodiments, communication module 235 can also receive/communicate location data of the user (e.g., using GPS capabilities).

GUI generation module 240 can generate one or more graphical user interface (GUI) screens that allow for interaction with a user. In at least one embodiment, GUI generation module 240 generates a GUI for receiving and/or conveying information (e.g., information relating to goods or services) to the user's computing device. The GUI generation module 240 on a user's computing device can display a GUI providing data pertaining to goods or services and including one or more embedded triggers that detect the user interaction.

Figure 3:
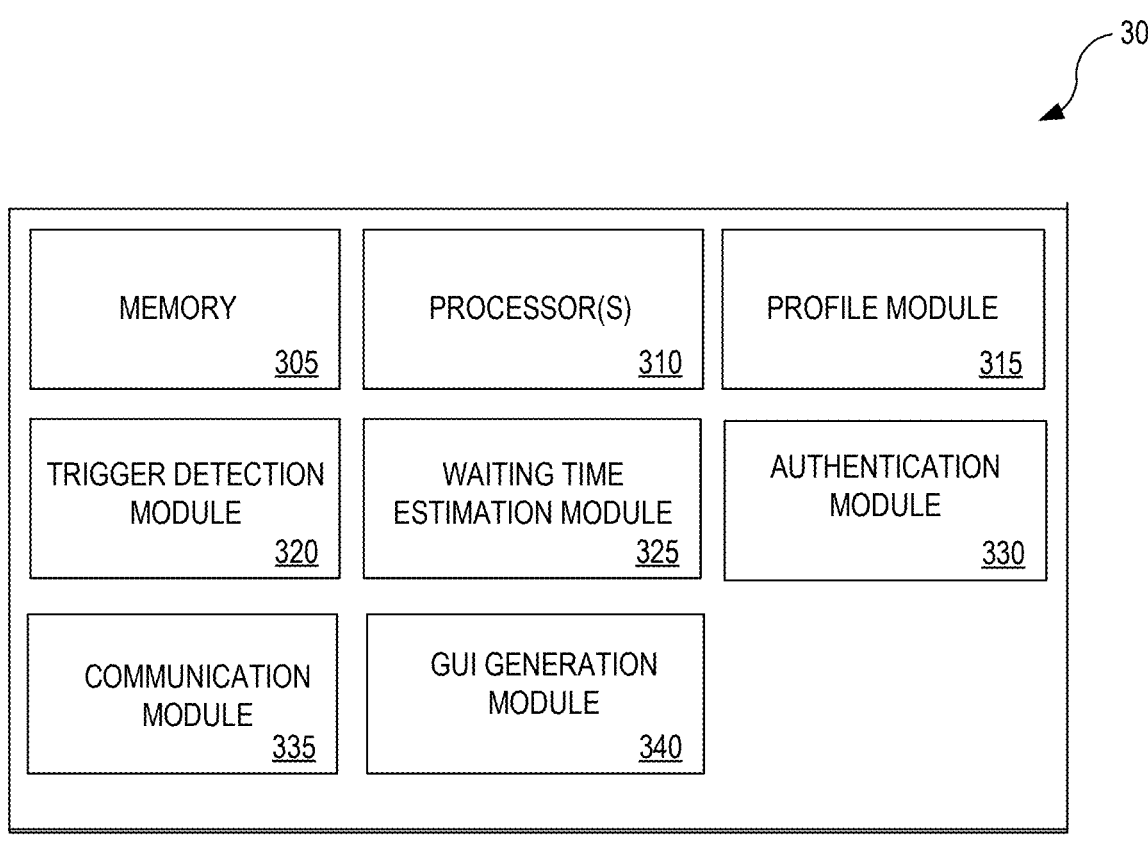
FIG. 3 illustrates various components of a call authentication platform that may be used in accordance with various embodiments of the present disclosure.

FIG. 3 illustrates a set of components 300 within a system such as call authentication platform 120 according to one or more embodiments of the present disclosure. In some embodiments, these components can be included in a server maintained by the entity that owns and operates call authentication platform 120. According to the embodiments shown in FIG. 3, call authentication platform 120 can include memory 305, one or more processors 310, profile module 315, trigger detection module 320, waiting time estimation module 325, authentication module 330, communication module 335, and GUI generation module 340. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 can store instructions for running one or more applications or modules on processor(s) 310. For example, memory 305 could be used in one or more embodiments to house all or some of the instructions needed to execute the functionality of trigger detection module 320, waiting time estimation module 325, authentication module 330, and GUI generation module 340.

Profile module 315 can maintain profiles for users that reflect the personal and financial profiles of the users, similar to the profiles described with respect to profile module 225. In some embodiments, profile module 315 can store a collection of keys and/or session-specific codes that are unique to a user. When a user wants to add a device to the data exchange session or to invite other users to a multi-party conference, one or more keys and/or one or more session-specific codes can be communicated to a user for authenticating a user's device or a remote server depending on the authentication scenario.

Trigger detection module 320 can identify or detect triggers that are embedded in the GUI of webpages or mobile application pages that are displayed to users. Such triggers can be used to indicate that a user will be calling an entity. The subject matter of the call will likely be in regard to the subject matter of the webpage or the mobile application page. Examples of embedded triggers can include one or more of: a help menu, a contact menu, or a call initiation button included inside the application program associated with and communicating with the call authentication platform 120. This facilitates a better and streamlined user experience as a user can be directed to skilled representatives who can assist the user with answering his or her questions.

In some embodiments, a skilled representative can assist with more than one item of goods or services. Furthermore, in scenarios where a user intends to speak with a customer representative, a call from the user can be directly forwarded to the relevant representative without incurring delays associated with reaching the relevant representative. Also, in some embodiments, the user can circumvent unnecessary voice menus on an interactive voice response (IVR) system when calling the relevant customer representative, and can reach out to the relevant representative with zero or no bounce-around delays. In some embodiments, trigger detection module 320 facilitates data exchanges with a user (even without a call) during which a user can receive necessary compliance information (e.g., specific to an item of goods or services or specific to the finance industry) from a representative. This is beneficial because the representative does not need to read aloud the compliance information when the user is on a call with the representative, and the user can thus review, acknowledge, and/or sign documents including compliance information pre-call. Further, not only does this provide a better experience for the user, but additionally, this enables a representative to provide services tailored to the user's needs and save on time.

Waiting time estimation module 325 calculates an estimated time before a user can speak with a customer representative. Such a calculation can be based on a number of callers ahead of the user in a caller queue, an average duration of a call for exchanging information relating to the goods or services, and a total number of representatives who have skills to assist the user with questions related to the goods or services. In some embodiments, a user who intends to speak with a representative can choose to have the representative call the user back. In some embodiments, the user can be on hold in queue waiting to speak with the representative after an estimated waiting time. In some embodiments, a user can call the representative after an estimated waiting time.

Authentication module 330 can provide one or more mechanisms for authentication of a user's computing devices. According to some embodiments, the disclosed system facilitates a user to continue an ongoing electronic session including a voice call and/or a data exchange (e.g., involving exchange of compliance information forms, legal documents, regulatory information, disclosure statements, terms and conditions of goods or services, disclaimer information, and the like) over a second device. The electronic communications can engage both devices simultaneously, or only one user device can be active at a time.

In some embodiments, a session is identified with a session identifier that identifies a time stamp, an IP address of a user's device, a device ID, and the like. When a user indicates that the user would like to continue a data exchange seamlessly to another device, authentication module 330 utilizes at least a portion (or, the entirety) of the session identifier for continuing the data exchange session across other devices. Thus, embodiments, disclosed herein facilitate electronic sessions to continue seamlessly over multiple devices. Accordingly, authentication module 330 on a computing device 110 can be involved in authentication of user devices. For example, in some embodiments, a remote server of the organization can communicate a session-specific code (e.g., a QR code or a pseudorandom number) to a first application running on a first computing device of a user that is engaged in an electronic session with a remote server. After receiving the session-specific code at the first computing device, the user can enter the session-specific code into a second application running on a second computing device of the user to continue data exchange with the remote server using the second computing device.

Communication module 335 facilitates communication (e.g., in the form of voice and/or data) with users' electronic devices (e.g., through mobile application programs and desktop application programs). In some embodiments, communication module 335 can receive and/or transmit session-specific codes from/to a user's first computing device when a user intends to continue a data exchange with a customer representative of an organization seamlessly to a second device, without requiring the user to enter login information for identifying himself or herself to the call authentication platform 120 of the organization or entity.

GUI generation module 340 can generate one or more GUI screens that allow for interaction with a user. In at least one embodiment, GUI generation module 340 generates a GUI receiving and/or conveying information from/to the user's computing device(s). In some embodiments, GUI generation module 340 can simultaneously display two screens to a customer representative working at a call center of an organization. The screens may correspond to two user devices when a user is simultaneously on two devices for a data exchange/voice call with the customer representative. In some embodiments, a second user is invited for a multi-party call involving the first user, the second user, and a customer representative. In such embodiments, GUI generation module 340 can display two screens corresponding to the screen of the first user and the screen of the second user while they are on the multi-party call.

Figure 4:
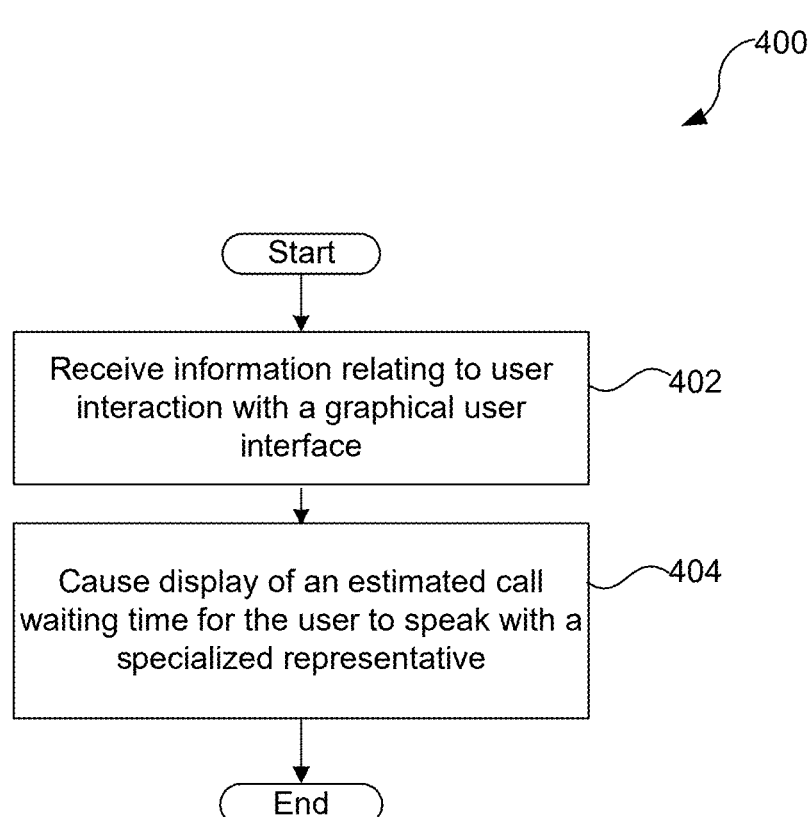
FIG. 4 is a flowchart illustrating a set of operations of the call authentication platform in accordance with various embodiments of the present disclosure.
Figure 5:
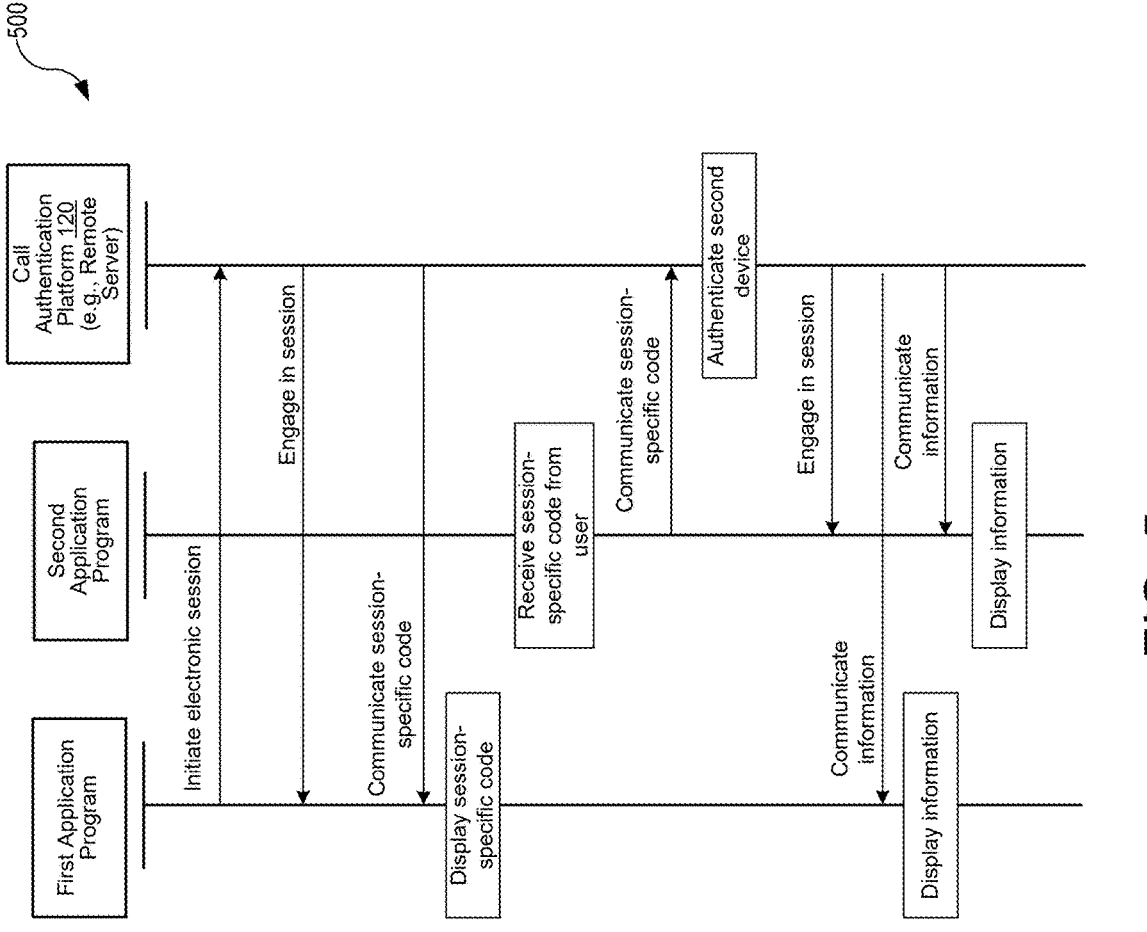
FIG. 5 is a sequence diagram illustrating a set of interactions between the call authentication platform, a first application program running on a first computing device, and a second application program running on a second computing device in accordance with various embodiments of the present disclosure.
Figure 6:
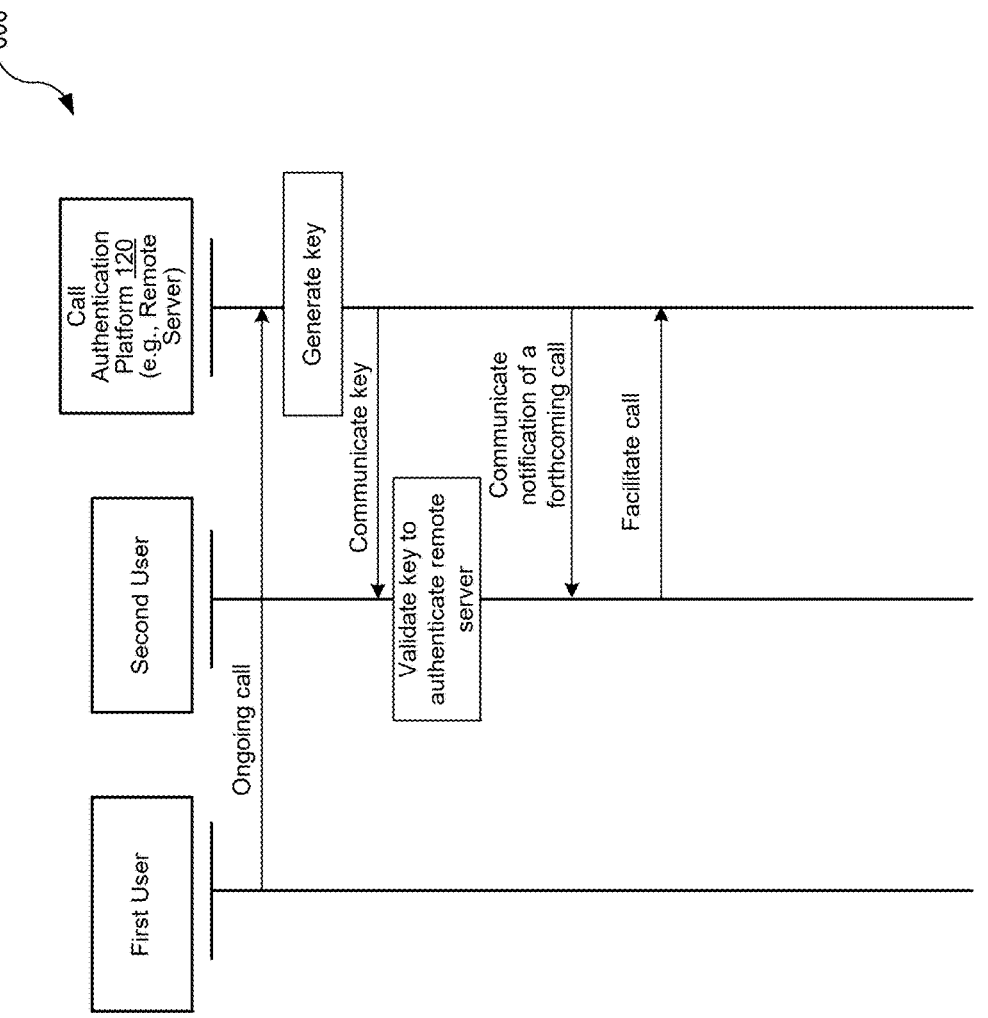
FIG. 6 is a sequence diagram illustrating a set of interactions between the call authentication platform, a first application program running on a first computing device, and a second application program running on a second computing device in accordance with various embodiments of the present disclosure.

FIGS. 4-6 depict respectively a flowchart and two sequence diagrams illustrating sets of operations. In some embodiments, fewer than all of the operations in each set of operations are performed, whereas in other embodiments additional operations are performed. Moreover, in some embodiments, the operations may be performed in different orders or in parallel. The operations can be performed by various components of computing devices 110 and/or call authentication platform 120 such as those illustrated in FIG. 2 and/or FIG. 3.

FIG. 4 is a flowchart illustrating a set of operations 400 for calculation of an estimated call waiting time in accordance with various embodiments of the disclosure. In some embodiments, the set of operations 400 can be performed by a server coupled to the call authentication platform 120 while in other embodiments, the set of operations 400 can be performed by an application program (e.g., a mobile application or a desktop application) running on a user's computing device.

Receive operation 402 receives information relating to user interaction with a GUI of an application program running on a computing device 110 associated with a user. The GUI can provide data pertaining to goods or services and can include one or more embedded triggers that detect the user interaction. For example, a user interacting with a GUI (e.g., including embedded triggers) of a mobile application can provide information relating to user interaction to call authentication platform 120, such as trigger detection information, goods or services interesting to the user, or more generally, a context associated with the user's browsing conditions. Such a context can include information relating to a user's IP address, a device ID, a timestamp, a hostname, pages or portions of the pages browsed by a user, and the like.

Triggers embedded in a GUI can include a help menu, a contact menu, or a call initiation button included inside the application program associated with the call authentication platform 120. In some embodiments, the system calculates an estimated call waiting time for a user to speak with the representative. The estimated call waiting time can be based on a number of callers ahead of the user in a caller queue, an average duration of a call for exchanging information relating to the goods or services, and availability of representatives who have skills to assist the user with questions related to the goods or services. Thus, the context of the call may help determine the wait time (e.g., if a call relates to investments, wait time is determined at least in part by availability of representatives in the investment area). Display step 404 causes the display of an estimated call waiting time to speak with a specialized representative.

FIG. 5 is a sequence diagram illustrating a set of interactions 500 between the call authentication platform 120, a first application program running on a first computing device, and a second application program running on a second computing device. The computing devices can belong to the same user or they can belong to different users. The sequence diagram in FIG. 5 is directed at an embodiment in which a user intends to continue to maintain a data exchange session with a representative of an entity offering goods or services of interest to the user across more than one user device, e.g., a first computing device and a second computing device. The representative can be sitting at a computer terminal coupled to call authentication platform 120, and can, for example, review screens of either or both the first computing device and the second computing device.

First, the first application program initiates an electronic session with call authentication platform 120. This session can, for example, be initiated after the first application program receives information relating to interaction of the user with the first application program. In response, call authentication platform 120 engages in a session with the first application program. (In some embodiments, an ongoing call can be included as part of the communication session.) In some embodiments, a user expresses, to the first application program, an intent to receive information relating to the goods or services at a second computing device. Accordingly, call authentication platform 120 communicates a session-specific code to the first application program, which is displayed to the user. The user can enter the session-specific code in the second application program which causes the second application program to receive it.

After receiving the session-specific code, the second application program communicates the session-specific code to call authentication platform 120 to validate the authenticity of the session-specific code. In response to receiving the session-specific code, call authentication platform 120 authenticates the second computing device, and thereby the user can continue the data exchange session (e.g., included as part of the session initiated by the first application program) without entering his or her login credentials.

In some embodiments, call authentication platform 120 can communicate information to the first application program (and/or the second application program) including information pertaining to goods or services of interest to the user. In some embodiments, the data exchange can involve a representative sending forms and compliance information (e.g., for the user's review, acknowledgement, and/or signature) to either one or both the first computing device and the second computing device, which can be displayed by either or both devices. Signed or acknowledged compliance information can be transmitted back to call authentication platform 120. In some embodiments, call authentication platform 120 can communicate a message to the first application program upon successfully starting to communicate with the second computing device. In some embodiments, disconnecting the first computing device terminates the data exchange with the second computing device. In some embodiments, the first computing device can receive data (e.g., compliance information) in parallel with the second computing device.

FIG. 6 is a sequence diagram illustrating a set of inter- actions 600 between the call authentication platform 120, a first application program running on a first computing device, and a second application program running on a second computing device in accordance with various embodiments of the present disclosure. The first computing device can belong to a first user and the second computing device can belong to a second user. In the embodiment discussed in FIG. 6, the first user on an ongoing call with a customer representative intends to invite a second user for a multi-party conference, for example, by the first user informing the representative of the second user's phone number. Accordingly, FIG. 6 shows the first user on an ongoing call with call authentication platform 120. The representative, for example, can be at a computer terminal coupled to call authentication platform 120.

The first user expresses an interest in inviting the second user for a multi-party conference, either by verbal expression to the customer representative with the second user's phone number or by selecting an option to invite the second user via the first application program. In response, call authentication platform 120 generates a key, for example, while the first user is speaking with the customer representative. This key can include information identifying a context associated with the first user. Call authentication platform 120 communicates the key to the second application program running on the second computing device. For example, the key can be sent as a push notification to the second application program. The second application program, upon receiving the key, validates the key to verify the authenticity of the remote server. In some embodiments, call authentication platform 120 communicates notification of a forthcoming call (e.g., a multi-party conference) to the second application program. This informs the second user that a representative from an organization offering goods and services to the first user intends to call the second user for a multi-party conference. Thereby, the second user is not exposed to taking calls from unrecognized phone numbers and is legitimately made aware that a representative of the organization is going to call the second user for a multi-party conference. In some embodiments, the second application program facilitates the multi-party conference by receiving a call from the representative from within the second application program.

Computer System Overview

Figure 7:
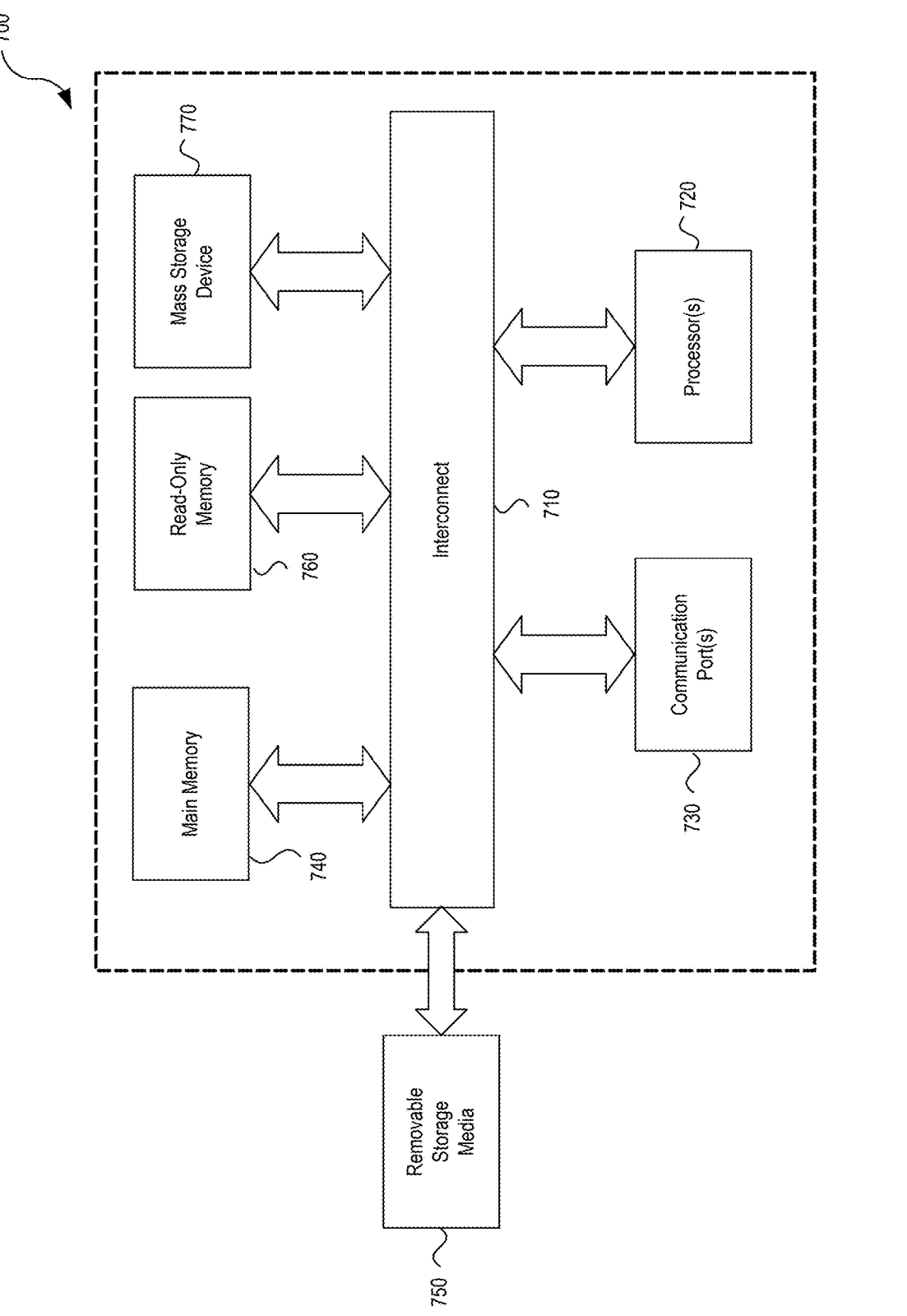
FIG. 7 illustrates an example of a computer system with which some embodiments of the present disclosure may be utilized.

Embodiments of the present disclosure include various steps and operations, which have been described above. A variety of these steps and operations may be performed by hardware components or they may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes an interconnect 710, at least one processor 720, at least one communication port

730, a main memory 740, a removable storage media 750, a read-only memory 760, and a mass storage device 770.

Processor(s) 720 can be any known processor, such as, but not limited to, an Intel® Itanium® or Itanium 2® processor(s), or AMD® Opteron® or Athlon MP® processor(s), or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen, depending on a network such a Local Area Network (LAN), Wide Area Network (WAN), or any network to which the computer system 700 connects.

Main memory 740 can be random access memory (RAM) or any other dynamic storage device(s) commonly known in the art. Read-only memory 760 can be any static storage device(s), such as programmable read-only memory (PROM) chips for storing static information, such as instructions for processor(s) 720.

Mass storage device 770 can be used to store information and instructions. For example, hard disks such as the Adaptec® family of SCSI drives, an optical disc, an array of disks such as RAID, the Adaptec family of RAID drives, or any other mass storage devices may be used.

Interconnect 710 communicatively couples processor(s) 720 with the other memory, storage, and communication blocks. Interconnect 710 can be a PCI/PCI-X- or SCSI-based system bus, depending on the storage devices used.

Removable storage media 750 can be any kind of external hard-drives, floppy drives, USB drives, IOMEGA® Zip Drives, compact disc-read-only memory (CD-ROM), compact disc-re-writable (CD-RW), or digital video disc-read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for authentication of calling parties for simultaneous voice and data communications with multiple parties over multiple electronic mediums including a variety of electronic devices. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
sending, from at least one server to a first application program running on a first device, a notification indicating that a user will receive a communication related to an electronic session from an entity offering at least one item,
wherein the first device displays compliance information for the user to act on prior to starting the electronic session regarding the at least one item;
sending, to the first application program, a session-specific code corresponding to the electronic session;
receiving, at the at least one server, the session-specific code from a second application program running on a second device for identifying the electronic session to authenticate the user without requiring login credentials of the user; and
in response to receiving the session-specific code from the second application program running on the second device, authenticating, by the at least one server, the second device via the second application program.

2. The method of claim 1, further comprising:
upon authenticating the second device via the second application program:
engaging, by the at least one server, in electronic communication with the second device for continuing the electronic session simultaneously with the first device, and
communicating, to the second device, information relating to the at least one item.

3. The method of claim 1, further comprising:
causing, by the at least one server, display, via a display of the first device, of an estimated call waiting time for the user to speak with a representative of the entity offering the at least one item,
the estimated call waiting time based on at least one of
a number of callers ahead of the user in a caller queue,
an average duration of a second call for exchanging information relating to the at least one item, or
a total number of representatives having skills to assist the user with questions related to the at least one item.

4. The method of claim 1, further comprising:
in response to the user expressing an intent to receive, from the at least one server, information relating to the at least one item at the first device:
receiving, by the at least one server, information relating to user interaction with a graphical user interface of the first application program running on the first device associated with the user, the graphical user interface providing data pertaining to the at least one item and including one or more embedded triggers that detect the user interaction,
wherein the one or more embedded triggers include at least one of: a help menu, a contact menu, or a call initiation button included inside the first application program.

5. The method of claim 1, further comprising:
receiving, by the at least one server, a second notification associated with the user contacting the entity offering the at least one item; and
receiving, by the at least one server from the first application program, information relating to an interaction of the user with the first application program to determine the at least one item.

6. The method of claim 1, further comprising:
sending, by the at least one server to the second application program, information relating to the at least one item.

7. The method of claim 6, wherein the information relating to the at least one item includes at least one of: regulatory information or legal information.

8. A system comprising:

one or more processors; and one or more memories storing instructions that, when executed by the one or more processors, cause the system to perform a process comprising:

sending, from at least one server to a first application program running on a first device, a notification indicating that a user will receive a communication related to an electronic session from an entity offering at least one item, wherein the first device displays compliance information for the user to act on prior to starting the electronic session regarding the at least one item;

sending, to the first application program, a session-specific code corresponding to the electronic session;

receiving, at the at least one server, the session-specific code from a second application program running on a second device for identifying the electronic session to authenticate the user without requiring login credentials of the user; and in response to receiving the session-specific code from the second application program running on the second device, authenticating, by the at least one server, the second device via the second application program.

9. The system of claim 8, wherein the process further comprises:

upon authenticating the second device via the second application program:

engaging, by the at least one server, in electronic communication with the second device for continuing the electronic session simultaneously with the first device, and communicating, to the second device, information relating to the at least one item.

10. The system of claim 8, wherein the process further comprises:

causing, by the at least one server, display, via a display of the first device, of an estimated call waiting time for the user to speak with a representative of the entity offering the at least one item, the estimated call waiting time based on at least one of a number of callers ahead of the user in a caller queue, an average duration of a second call for exchanging information relating to the at least one item, or a total number of representatives having skills to assist the user with questions related to the at least one item.

11. The system of claim 8, wherein the process further comprises:

in response to the user expressing an intent to receive, from the at least one server, information relating to the at least one item at the first device:

receiving, by the at least one server, information relating to user interaction with a graphical user interface of the first application program running on the first device associated with the user, the graphical user interface providing data pertaining to the at least one item and including one or more embedded triggers that detect the user interaction, wherein the one or more embedded triggers include at least one of: a help menu, a contact menu, or a call initiation button included inside the first application program.

12. The system of claim 8, wherein the process further comprises:

receiving, by the at least one server, a second notification associated with the user contacting the entity offering the at least one item; and receiving, by the at least one server from the first application program, information relating to an interaction of the user with the first application program to determine the at least one item.

13. The system of claim 8, wherein the process further comprises:

sending, by the at least one server to the second application program, information relating to the at least one item.

14. The system of claim 13, wherein the information relating to the at least one item includes at least one of: regulatory information or legal information.

15. A non-transitory computer-readable medium storing instructions that, when executed by a computing system, cause the computing system to perform operations comprising:

sending, from at least one server to a first application program running on a first device, a notification indicating that a user will receive a communication related to an electronic session from an entity offering at least one item, wherein the first device displays compliance information for the user to act on prior to starting the electronic session regarding the at least one item;

sending, to the first application program, a session-specific code corresponding to the electronic session;

receiving, at the at least one server, the session-specific code from a second application program running on a second device for identifying the electronic session to authenticate the user without requiring login credentials of the user; and in response to receiving the session-specific code from the second application program running on the second device, authenticating, by the at least one server, the second device via the second application program.

16. The non-transitory computer-readable medium of claim 15, wherein the operations further comprise:

upon authenticating the second device via the second application program:

engaging, by the at least one server, in electronic communication with the second device for continuing the electronic session simultaneously with the first device, and communicating, to the second device, information relating to the at least one item.

17. The non-transitory computer-readable medium of claim 15, wherein the operations further comprise:

causing, by the at least one server, display, via a display of the first device, of an estimated call waiting time for the user to speak with a representative of the entity offering the at least one item, the estimated call waiting time based on at least one of a number of callers ahead of the user in a caller queue, an average duration of a second call for exchanging information relating to the at least one item, or a total number of representatives having skills to assist the user with questions related to the at least one item.

18. The non-transitory computer-readable medium of claim 15, wherein the operations further comprise:

in response to the user expressing an intent to receive, from the at least one server, information relating to the at least one item at the first device:

receiving, by the at least one server, information relating to user interaction with a graphical user interface of the first application program running on the first device associated with the user, the graphical user interface providing data pertaining to the at least one item and including one or more embedded triggers that detect the user interaction, wherein the one or more embedded triggers include at least one of: a help menu, a contact menu, or a call initiation button included inside the first application program.

19. The non-transitory computer-readable medium of claim 15, wherein the operations further comprise:

receiving, by the at least one server, a second notification associated with the user contacting the entity offering the at least one item; and receiving, by the at least one server from the first application program, information relating to an interaction of the user with the first application program to determine the at least one item.

20. The non-transitory computer-readable medium of claim 15, wherein the operations further comprise:

sending, by the at least one server to the second application program, information relating to the at least one item, wherein the information relating to the at least one item includes at least one of: regulatory information or legal information.

* * * * *